United States Patent [19]
Laird et al.

[11] Patent Number: 5,991,262
[45] Date of Patent: Nov. 23, 1999

[54] METHOD AND APPARATUS FOR REDUCING PEAK-TO-AVERAGE POWER RATIO OF A COMPOSITE CARRIER SIGNAL

[75] Inventors: Kevin Michael Laird, Keller; Jack Anthony Smith, Bedford, both of Tex.

[73] Assignee: Motorola, Inc., Schaumburg, Ill.

[21] Appl. No.: 08/829,564

[22] Filed: Mar. 31, 1997

[51] Int. Cl.$^6$ .............................. H04B 7/214; H04J 13/00
[52] U.S. Cl. ......................... 370/209; 370/249; 455/126
[58] Field of Search .................................... 370/203, 208, 370/209, 335, 342, 441, 527, 529, 249; 375/200, 206, 359, 208, 367; 455/38.1, 501, 63, 67.3, 126

[56] References Cited

U.S. PATENT DOCUMENTS

| | | | |
|---|---|---|---|
| 5,103,459 | 4/1992 | Gilhousen et al. | 370/209 |
| 5,515,396 | 5/1996 | Dalekotzin | 370/209 |
| 5,623,485 | 4/1997 | Bi | 370/209 |
| 5,712,869 | 1/1998 | Lee et al. | 370/209 |

*Primary Examiner*—Chi H. Pham
*Assistant Examiner*—Ricky Q. Ngo
*Attorney, Agent, or Firm*—Richard A. Sonnentag; Hossein Beladi; Mario J. Donato, Jr.

[57] ABSTRACT

A peak-reducing waveform is estimated and summed with a composite signal to reduce the peak-to-average power ratio of the composite signal. The estimate of the peak-reducing waveform is modified to have Walsh code components orthogonal to the assigned Walsh codes. An iterative process of estimating subsequent peak-reducing waveform is implemented to produce a peak-reducing waveform which, when summed with the composite signal, results in a composite signal having a peak-to-average ratio at a desired level and thus does not have the effects of remodulating the assigned Walsh codes. Constraints on the magnitude of the unassigned Walsh code components can be included for controlling the power level under the unassigned Walsh codes.

19 Claims, 1 Drawing Sheet

WHT: WALSH HADAMARD TRANSFORM

— PRIOR ART —

WHT: WALSH HADAMARD TRANSFORM

METHOD AND APPARATUS FOR REDUCING PEAK-TO-AVERAGE POWER RATIO OF A COMPOSITE CARRIER SIGNAL

FIELD OF THE INVENTION

The present invention relates to communication devices, particularly, to transmitters embodied in the telecommunication devices.

BACKGROUND OF THE INVENTION

In Direct Sequence Code Division Multiple Access (DS-CDMA) cellular telecommunication systems, a cellular base station communicates with multiple mobile units while maintaining exclusive communication links with the mobile units. Each exclusive link is assigned a code that is orthogonal with all other codes. The most commonly used type of code is the Walsh code. The Walsh code has a property that all its member codes are orthogonal with each other. This property of Walsh codes allows a base station in DS-CDMA system to transmit a composite of carrier signals, where each carrier signal is coded with an assigned Walsh code. Each receiving unit extracts desired information based on the assigned Walsh code and ignores other orthogonal Walsh codes.

The composite carrier signal is amplified through a linear power amplifier that has a finite peak power capacity; however, the finite peak power of the composite carrier signal may be substantially large. In such a system, the linear power amplifier should have an arduous linear operating region, that in turn places extreme burden on designing and maintaining the linear power amplifier within its linear operating requirements. As a result, the cost of the linear power amplifiers, in DS-CDMA system, are substantially increased.

A clipping technique is a commonly used method for relaxing linear power amplifiers operating requirements. In this method, if the composite carrier signal peak amplitude is above a certain level, the signal amplitude is limited prior to being input to the transmitter linear power amplifier.

For example, with reference to FIG. 1, a DS-CDMA transmitter system for transmitting a composite carrier signal including a clipper 103 is shown. A plurality of channels 101-1 through 101-L are summed together in a summer 105 to produce a composite signal 102 x(n) where the plurality of channels 101-1 through 101-L are respectively coded with a plurality of assigned Walsh codes 1 through L. Normally in a given Walsh code space, the total number of available Walsh codes are more than what actually are assigned at a given time.

The composite signal 102 x(n) is input to the clipper 103. The clipper 103 clips the peaks of the composite signal 102 x(n), and produces a clipped composite signal 104 y(n). However, the clipping technique adds a significant signal degradation distortion, as commonly known as remodulation effect, at the assigned Walsh codes to the composite signal 104 y(n).

Therefore, a need exists for a solution that allows reducing peak-to-average power ratio of a composite carrier signal without having the detrimental effects of the clipping technique.

DETAILED DESCRIPTION OF THE PREFERRED EMBODIMENT

Figure 1:
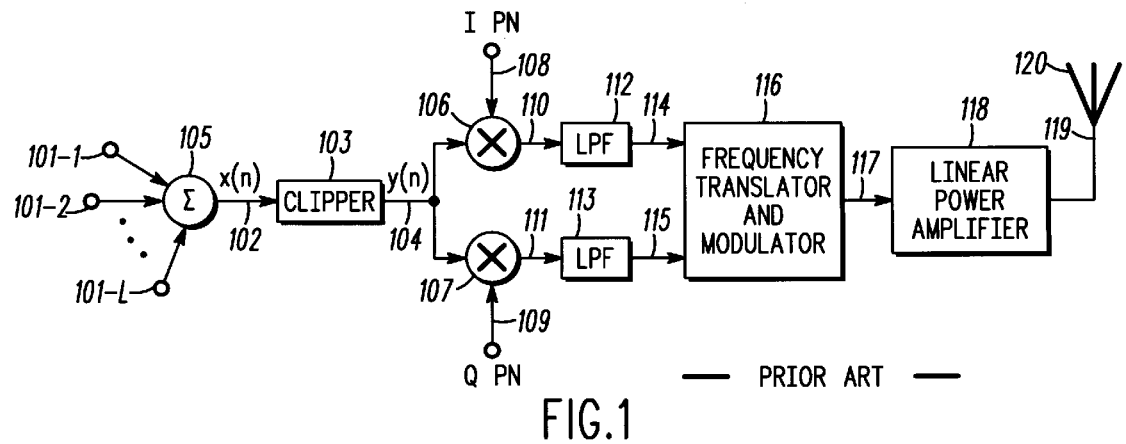
FIG. 1 depicts a DS-CDMA transmitter system for transmitting a composite carrier signal.

In the present invention a peak-reducing waveform is obtained through an iterative process. The estimate of the peak-reducing waveform is modified to have Walsh code components orthogonal to the assigned Walsh codes. The process of optimizing subsequent estimate is repeated as many times as desired for producing a peak-reducing waveform that when summed with the composite signal the resultant composite signal has peak-to-average ratio at a desired level and does not have the effects of remodulating the assigned Walsh codes. The present invention, further, can be extended to make constraints on the magnitude of the unassigned Walsh code components for controlling the power level under the unassigned Walsh codes.

In the present invention, the peak-reducing waveform is limited to have power under the unassigned Walsh codes, and, when summed with the composite signal, the resultant composite signal has the desired peak-to-average power ratio and the amount of power under the unassigned Walsh codes is optimized to be below a desired level.

The iterative process implemented in accordance with the present invention begins by creating a first estimate of the peak-reducing waveform. The first estimate of the peak-reducing waveform is produced by first clipping the composite signal 102 x(n) to a desired level, extracting clipped portion and inverting the extracted signal to produce the first estimate of the peak-reducing waveform. Ideally, the first estimate of the peak reducing waveform can be summed with the composite signal 102 x(n) to create a composite signal that has a reduced peak-to-average power ratio. However, the probability is minimal that the first estimate of the peak-reducing waveform has Walsh code components orthogonal to the assigned Walsh codes in the composite signal.

In the present invention, the first estimate of the peak-reducing waveform is modified to have Walsh code components orthogonal to the assigned Walsh codes. A Walsh Hadamard Transform (WHT) operation decomposes the first estimate of the peak-reducing waveform into components of Walsh codes. The components corresponding to the assigned Walsh codes are then forced to zero, and inverse of WHT operation reconstructs from the modified set of the Walsh code components a first reconstructed peak-reducing waveform. This is the first reconstructed peak reducing-waveform that has Walsh code components orthogonal to the assigned Walsh codes.

The first reconstructed peak-reducing waveform when summed with the composite signal will not remodulate the assigned Walsh codes; however, its peak reducing property is less than of ideal.

For further optimizing the first reconstructed peak reducing-waveform, a second estimate of the peak reducing waveform is produced to have more effective peak reducing property and Walsh code components orthogonal to the assigned Walsh codes. The first reconstructed peak-reducing waveform is summed with the composite signal 102 x(n) to produce a first composite signal with reduced peak-to-average ratio. This resultant signal is clipped to the desired level and the clipped portion is extracted and inverted to produce the second estimate of the peak-reducing waveform.

The second estimate of the peak-reducing waveform, through the WHT, is decomposed into Walsh code components; then, the Walsh code components corresponding to the assigned Walsh codes are forced to zero. Next, the operation of inverse of WHT reconstructs from the latest modified Walsh code components a second peak-reducing waveform. The second reconstructed peak-reducing waveform is the further optimized of the first reconstructed peak-reducing waveform.

The second reconstructed peak-reducing waveform when summed with the composite signal will not remodulate the assigned Walsh codes, and it has more effective peak reducing property than the first reconstructed peak-reducing waveform. The process of optimization is repeated as many times as desired for producing a peak-reducing waveform that when summed with the composite signal the resultant composite signal has peak-to-average ratio at a desired level and does not have the effects of remodulating the assigned Walsh codes.

The WHT operation is modified to include an efficient implementation. One such efficient implementation is to perform partial WHT operation instead of full WHT operation. The WHT operations are performed for every possible codes within the space of the codes to learn which codes have been assigned in the composite signal, and whether the estimate of the peak-reducing waveform contains any of the assigned codes. Therefore, any efficient method that provides such teaching as to which codes have been assigned and whether the estimate of the peak-reducing waveform contains any of the assigned codes is a substitute for the WHT operations.

The partial WHT operation is performed to learn the energy content in the unassigned codes of the peak-reducing waveform, when the assigned codes are known prior to the partial WHT operation. The WHT operation, in this case, is partial for being limited to the unassigned codes in determining the corresponding components of the unassigned codes.

In the modification step where the components of the assigned codes in the estimate of the peak-reducing waveform are set to zero, the present invention, alternatively, sets the assigned codes components to a value other than zero; or in another alternative, it sets a plurality of the assigned codes components to zero and the remaining portion to a value other than zero. Although the effect of remodulation is due to having non-zero code component values of the assigned codes in the peak-reducing waveform, the system tolerates some remodulation effects.

While the above optimization process does not constrain the magnitude of the unassigned Walsh code components, the present invention, further, can be extended to make constraints on the magnitude of the unassigned Walsh code components for controlling the power level under the unassigned Walsh codes. The above optimization process, at the step that the assigned Walsh code components are forced to zero, is further modified to include a step that the magnitudes of the unassigned Walsh code components are constrained to a limited magnitude; thereby, the amount of power under the unassigned Walsh codes are correspondingly limited.

Figure 2:
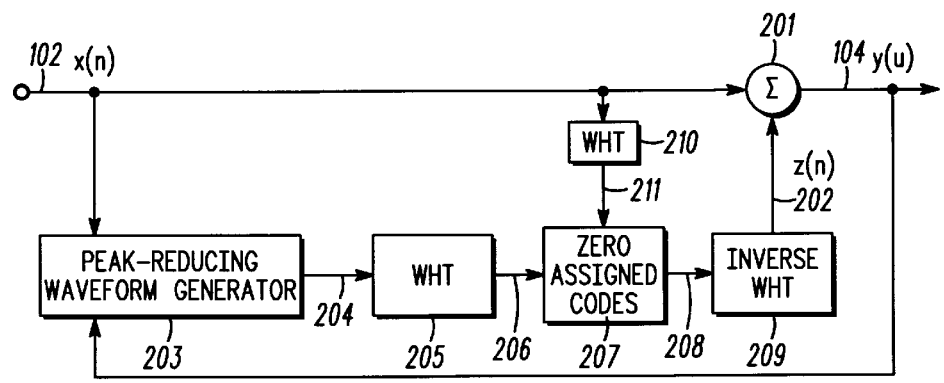
FIG. 2 generally depicts a block diagram of the apparatus in accordance with the present invention.

FIG. 2 generally depicts a block diagram of the apparatus in accordance with the present invention. The present invention as depicted in FIG. 2 is substituted for the clipper 103 in the FIG. 1; in relation to all other components of the transmitter shown in the FIG. 1, it receives the signal 102 x(n) and produces the signal 104 y(n). The present invention is an apparatus for generating a peak reducing waveform 202 z(n). When the signal 202 z(n) is summed with the composite signal 102 x(n) in a summer 201, the resultant composite signal 104 y(n) has the desired peak-to-average power ratio while the remodulation effects of the assigned Walsh codes have been reduced or eliminated in the signal 104 y(n). Further, the power level under the unassigned Walsh codes has been limited to a desired level.

One ordinary skilled in the art appreciates that the input signal 102 x(n) is described as:

$$x(n) = \sum_{i=1}^{L} \alpha_i W_i \quad (1)$$

where x(n) is a summation of all assigned, 1 through L, Walsh code functions Wi where each is multiplied by a power factor α that represents the assigned power level to each Walsh code function Wi. The signal 104 y(n) is produced by an iterative method of optimizing the signal 202 z(n) until the signal 104 y(n) has the desired peak-to-average power ratio and is best described by the following:

$$y(n) = \sum_{i=1}^{L} \alpha_i W_i + \sum_{i=L+1}^{N} \gamma_i W_i. \quad (2)$$

One ordinary skilled in the art appreciates that the first term on the right hand side of the equation (2) is the signal 102 x(n), and the second term is the contribution of the signal 202 z(n). There is a total number of "N" available Walsh codes. Note that the assigned Walsh codes, i=1 through L, of the signal 102 x(n) have not been distorted by any additional term, and contribution of the signal 202 z(n) is all under unassigned Walsh codes L+1 through N. Each of the unassigned Walsh codes functions Wi has a power factor γ.

The composite signal 102 x(n) is decomposed to its Walsh code components in a WHT block 210 for identifying all the assigned Walsh codes components. The block 210 identifies the assigned Walsh codes power factors which are the α terms.

The composite signal 102 x(n) also is input to a peak-reducing waveform generator 203. The block 203 generates a first estimate of a peak-reducing waveform 204 which is based on the composite signal 102 x(n). The signal 204 is decomposed in a WHT block 205 to its Walsh codes components.

A block 207 receives the results of the WHT operations in the blocks 205, and 210. The block 207 forces to zero the Walsh codes power factor components that were identified in the block 205 that corresponds to the assigned codes, α terms, that were identified in the block 210. As a result, the remaining Walsh codes power factor components become the γ power factors.

The result of the block 207 is passed to a block 209 for an inverse WHT operation to produce the signal 202 z(n) having only y power factor multipliers and no α power factor multipliers. The signal 202 z(n) is summed with the signal 102 x(n) in a summer 201 to produce a first signal 104 y(n) as shown in the equation (2).

The first acquired signal 104 y(n) is fed back to the block 203. The block 203 then generates a second estimate of the peak-reducing waveform 204 which is based on the first signal 104 y(n). The second estimate of the peak-reducing waveform 204 is decomposed to its Walsh code components in the block WHT 205. The results are fed into the block 207 where the Walsh code components corresponding to the identified α terms are forced to zero. Next, the results out of block the 207 are fed into the block 209 where the inverse WHT is performed. The results of the block 209 operation is a newly acquired signal 202 z(n) which has only updated γ power factors. The newly acquired signal 202 z(n) has more effective peak-reducing property than the first acquired signal 202 z(n). The signal 102 x(n) and the newly acquired-peak reducing signal 202 z(n) are summed in the summer 201 to produce a new signal 104y(n). The new signal 104 y(n) has a peak-to-average power ratio that is closer to the desired level than the first iteration, and it is best described as shown in equation (2).

For the next iteration, the newly acquired signal 104 y(n) is fed back again to the block 203 for producing another peak-reducing waveform. The process of WHT in block 205, assigning ax terms to zero in block 207, inverse WHT in block 209, and summation in block 201 are repeated to produce a latest signal 104 y(n) which has peak-to-average power ratio that is much closer to the desired level and has no distortion terms under the assigned Walsh codes as it is best shown in the equation (2). This iteration process is repeated until the desired signal 104 y(n) is obtained.

The iteration process is complete once no further optimizations are obtained in the signal 104 y(n). The block 203 makes the final decision whether the desired signal 104 y(n) has been obtained.

Furthermore, in accordance with the invention, the block 207, in addition to forcing to zero the Walsh codes components corresponding to the α terms, limits the magnitude of the remaining Walsh codes components which are the γ power factors. The power level under the unassigned codes are controlled by limiting the magnitude of the γ power factors. When the resulting signal 202 z(n) is added to the composite signal 102 x(n), the resulting signal 104 y(n) has limited power level under the unassigned Walsh codes.

While the invention has been particularly shown and described with reference to a particular embodiment, it will be understood by those skilled in the art that various changes in form and details may be made therein without departing from the spirit and scope of the invention.

What is claimed is:

1. A method of reducing peak-to-average power ratio of a composite signal formed from a plurality of signals coded by a plurality of assigned codes, the method comprising the steps of:

producing a peak-reducing waveform coded with one or more codes which are orthogonal to said plurality of assigned codes, said step of producing including the steps of:

generating an estimate of said peak-reducing waveform; and modifying said estimate of said peak-reducing waveform to be coded with one or more codes which are orthogonal to said plurality of assigned codes; and summing said peak-reducing waveform to said composite signal to produce the composite signal having reduced peak-to-average power ratio.

2. The method of claim 1, further comprising the step of limiting the amount of power under one or more of the orthogonal codes.

3. The method of claim 1, wherein said composite signal having reduced peak-to-average power ratio is produced through a process of iteratively producing said peak-reducing waveform, and summing the iteratively produced peak-reducing waveform with said composite signal.

4. The method of claim 3, wherein a first iteratively produced peak-reducing waveform is based on said composite signal and subsequent iteratively produced peak-reducing waveform are based on said composite signal having reduced peak-to-average power ratio.

5. The method of claim 4, wherein the estimates of said peak-reducing waveforms are generated by implementing the steps of:

clipping the based composite signal to a desired level;

extracting the clipped portion; and inverting the extracted portion to generate said estimate of said peak-reducing waveform.

6. The method of claim 1, wherein said step of modifying includes the steps of:

decomposing said estimate of said peak-reducing waveform into a set of components of the codes;

substituting to zero the value of the components of said set of components of the codes that corresponds to components of said plurality of assigned codes for producing a modified set of components of the codes; and composing said modified set of components of the codes into said peak-reducing waveform.

7. The method of claim 6, wherein said plurality of assigned codes are Walsh codes.

8. The method of claim 6, wherein said decomposing step is performed through Walsh Hadamard Transform and said composing step is performed through an inverse of Walsh Hadamard Transform.

9. A method of claim 8, wherein said decomposing step is through a partial Walsh Hadamard Transform.

10. A method of claim 6, wherein said step of substituting substitutes a value other than zero.

11. The method of claim 6, wherein said step of substituting is to further include a value other than zero.

12. A method of claim 6, wherein said step of substituting is performed for a plurality of the total number of codes that corresponds to said plurality of assigned codes.

13. An apparatus for reducing peak-to-average power ratio of a composite signal formed from a plurality of signals coded by a plurality of assigned codes, comprising:

means for producing a peak-reducing waveform coded with one or more codes which are orthogonal to said plurality of assigned codes, wherein said means for producing includes:

means for generating an estimate of said peak-reducing waveform; and means for modifying said estimate of said peak-reducing waveform to be coded with one or more codes which are orthogonal to said plurality of assigned codes; and a summer for summing said peak-reducing waveform to said composite signal to produce the composite signal having reduced peak-to-average power ratio.

14. The apparatus of claim 13, wherein said means for producing said peak-reducing waveform further comprises:

means for decomposing said composite signal to identify a set of components of codes assigned to said composite signal, said means for generating an estimate of said peak-reducing waveform based on either said composite signal or said composite signal having reduced peak-to-average power ratio;

means for decomposing said estimate of sad peak-reducing waveform to identify a set of components of codes contained in said estimate said peak-reducing waveform;

means for modifying said set components of codes of said estimate of said peak-reducing waveform such that the resulting set components of codes are orthogonal to said set components of codes assigned to said composite signal; and means for composing said modified set of components of codes to produce said peak-reducing waveform.

15. An apparatus of claim 14, wherein said means for decomposing is performed through a Walsh Hadamard Transform and said means for composing is performed through an inverse of Walsh Hadamard Transform.

16. The apparatus of claim 15, wherein said means for decomposing is performed through a partial Walsh Hadamard Transform.

17. The apparatus of claim 14, wherein said means for modifying further comprises means for substituting to zero the components of said set components of codes of said estimate of said peak-reducing waveform that corresponds to said set components of codes assigned to said composite signal.

18. The apparatus of claim 14, wherein said means for modifying further comprises means for limiting the magnitude of said modified set of components of codes to limit the amount of power under said modified set of codes.

19. The apparatus of claim 17, wherein said means for modifying further comprises means for substituting to a value other than zero the components of said set components of codes of said estimate of said peak-reducing waveform that corresponds to said set components of codes assigned to said composite signal.

* * * * *

UNITED STATES PATENT AND TRADEMARK OFFICE
CERTIFICATE OF CORRECTION

PATENT NO : 5,991,262
DATED : November 23, 1999
INVENTOR(S): Laird et.al.

It is certified that error appears in the above-identified patent and that said Letters Patent are hereby corrected as shown below:

In Column 6 line 61 please remove the word "sad" and replace it with the word "said".

Signed and Sealed this

Tenth Day of April, 2001

*Attest:*

NICHOLAS P. GODICI

*Attesting Officer*   *Acting Director of the United States Patent and Trademark Office*